United States Patent Office 2,789,509
Patented Apr. 23, 1957

2,789,509

POLYCARBONATES FROM p-XYLYLENE GLYCOL-BIS-(ALKYL OR ARYL CARBONATES)

Delbert D. Reynolds and John Van Den Berghe, Rochester, N. Y., assignors to Eastman Kodak Company, Rochester, N. Y., a corporation of New Jersey No Drawing. Application December 8, 1953, Serial No. 399,822

12 Claims. (Cl. 260—77.5)

This invention relates to highly polymeric linear polycarbonates prepared by the self-condensation in the presence of an ester-interchange catalyst of a p-xylylene glycol-bis-(alkyl or aryl carbonate). These starting materials are hereinafter referred to as bis-(carbonate) monomers. This invention also includes polycarbonates prepared by condensing mixtures of these bis-(carbonate) monomers. Furthermore this invention relates to the processes involved in preparing the monomers and polymers.

It is an object of this invention to provide unexpectedly and unusually superior highly polymeric linear polycarbonates which are valuable in preparing fibers, film, etc. as described herein. It is a further object of this invention to provide p-xylylene glycol-bis-(alkyl or aryl carbonates) as monomeric starting materials for the preparation of the polycarbonates. An additional object of this invention resides in providing a process for converting the bis-(carbonate) monomer starting materials into the polycarbonates. Other objects will become apparent hereinafter.

Linear polycarbonates prepared by the condensation of p-xylylene glycol and m-xylylene glycol with an alkyl carbonate had been described by Carothers and his followers in the prior patent art as well as in Carothers' collected papers. Practically no subsequent work appears to have been performed in connection with the preparation of such linear polycarbonates. The materials prepared as described in Carothers' collected papers were of relatively low molecular weight and do not constitute highly polymeric linear crystalline polycarbonates which have high melting points, high intrinsic viscosities and which are useful in the formation of photographic film, fibers, threads, textile fabrics, electrical insulating materials, etc. The product obtained by Carothers is said to be a powder melting at less than 185° C. and having a molecular weight of not much more than 1,000. The products of the instant invention are highly polymeric polycarbonates which possess high intrinsic viscosity and high melting points such that they can be extruded to form films and the like which can be mechanically worked and heat-set to form molecularly oriented structures. According to Carothers, all of the polycarbonates described were prepared by alcoholysis between a glycol and ethyl carbonate in the presence of an alkaline catalyst, such as sodium, whereby vapors of an alcohol were driven off by heating.

One of Carothers' followers suggests that a trace of an aliphatic dibasic acid can be introduced into the reactants in Carothers' process whereby "super polycarbonates" can be produced by heat under a vacuum.

The prior art does not describe any satisfactory procedure which will produce linear highly polymeric polycarbonates having melting points of about 200° C. and having intrinsic viscosities of at least about 0.6 in a 60% phenol-40% tetrachloroethane solution. The process of the instant invention represents a great improvement over that described in the prior art since it provides a simple, direct, easily reproducible process, and the polycarbonates obtainable have unexpectedly superior characteristics.

There are other regards in which the polycarbonates of this invention are superior to those described in the prior art. These include the percentage of elongation, tenacity, elastic recovery, work recovery, stress relaxation, tensile strength, resistance of films to tearing and to repeated folding, modulus of elasticity, electrical properties, etc.

This invention is limited in scope to those particular bis-(carbonate) monomers disclosed since experiments demonstrate that only such compounds and a few others described in copending applications can be employed to produce highly polymeric linear polycarbonates of the type with which this invention is concerned.

The process of this invention for producing the novel polycarbonates comprises (A) self-condensing a bis-(carbonate) monomer having the following formula:

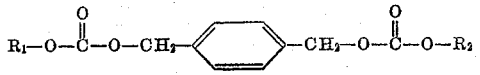

wherein $R_1$ and $R_2$ each represents a radical selected from the group consisting of lower alkyl radicals containing from 1 to 4 carbon atoms and aryl radicals of the benzene series containing from 6 to 8 carbon atoms, (B) in the presence of an ester-interchange catalyst containing titanium, which catalyst can be selected from the group consisting of the following compounds of titanium wherein the titanium is present in its tetravalent state.

$Ti(OR')_4$
$(R'R''_3N)_2Ti(OR')_6$
$(R'R''_3N)HTi(OR')_6$
$MHTi(OR')_6$
$M_2Ti(OR')_6$
$M'(HTi(OR')_6)_2$
$M'Ti(OR')_6$
$TiX_4$ and ether complexes of $TiX_4$ wherein the ether complexes are derived by reacting $TiX_4$ with an ether selected from the group consisting of aliphatic and alicyclic ethers containing from 2 to 10 carbon atoms and wherein $R'$ represents an alkyl radical containing from 1 to 8 carbon atoms, $R''$ represents an $R'$ radical or an aryl radical of the benzene series containing from 6 to 9 carbon atoms, X represents a halogen atom, M and M' represent metallic atoms as defined in concurrently-filed application Serial No. 397,036 which defines M and M' in the same manner as set forth in United States Patent 2,720,502 filed on October 3, 1952, by J. R. Caldwell, where M represents an alkali metal and M' represents an alkaline earth metal, (C) at an elevated temperature, (D) the condensation being conducted in an inert atmosphere and (E) the latter part of the condensation being conducted at a very low pressure.

It can readily be seen from the description of the process that there is no problem involved in adjusting the ratio of carbonate constituent to p-xylylene glycol constituent in the reaction vessel since the polycarbonates are produced according to this invention by the self-condensation of only one starting material. This establishes the composition of the polycarbonate produced since there could be no variation in the proportion of carbonate and glycol constituents. Moreover, the nature of this process makes it admirably suited to conducting the process on a continuous basis since no problems are involved in maintaining critical proportions of reactants.

Examples of the starting materials, i. e. the bis-(carbonate) monomers which can be used in the process of this invention include p-xylylene glycol-bis-(ethyl carbonate), p-xylylene glycol-bis-(p-tolyl carbonate), p-xylylene glycol-bis-(phenyl carbonate), p-xylylene glycol-bis-(n-butyl carbonate), p-xylylene glycol-bis-(isopropyl carbonate), p-xylylene glycol-bis-(methyl carbonate), etc.

In carrying out the process of this invention, the ester-interchange catalysts which can be employed as condensing agents are extremely limited as indicated. It would perhaps appear that any of the well-recognized ester-interchange catalysts would be operative. However, this has not been found to be the case. Very unexpectedly, the applicants discovered that only certain compounds of titanium can be satisfactorily employed as catalysts to produce the polyesters of this invention. Other compounds which are well recognized ester-interchange catalysts promote the degradation of the polymeric material with the evolution of carbon dioxide. This aspect of the invention is discussed in greater detail hereinbelow.

The titanium catalysts described above can be advantageously employed in an amount of from about 0.005% to about 0.2% by weight based on the weight of the bis-(carbonate) monomer being condensed. Higher or lower percentages can also be employed.

The temperature at which the condensation is conducted depends upon whether the process is conducted in the solid phase or in the liquid phase. When either type of process is used, the temperature can be advantageously increased during the course of condensation. Advantageously, the reaction can be considered as being conducted in two stages. The temperature to which the condensation reaction mixture is initially raised at the beginning of stage I is advantageously in excess of 200° C. Lower temperatures can also be employed although it is generally advantageous to use an initial temperature of at least about 200° C. Although it is convenient to consider the condensation process as being conducted in two separate stages, the actual condensation itself continues smoothly from stage I into stage II. The principle of distinction between the so-called two stages lies in the fact that during stage II, the pressure of the adjacent atmosphere under which the condensation is performed is greatly reduced. Although the temperature can remain the same for both the first and the second stage, it is advantageous to employ a somewhat higher temperature at about the same time the pressure is reduced, especially when the liquid phase process is being employed. The temperatures used during the latter part of stage II can advantageously be at least 250° C. or higher; the maximum temperature which can be employed is determined by the tendency of the polycarbonate to decompose at extremely high temperatures. As a practical matter, it is most advantageous to limit the maximum temperature to not much more than about 250° C. When a solid phase process is employed, the maximum temperature can be restricted to much lower temperatures, although the time required to accomplish the production of desirable linear polymeric polycarbonates may be increased accordingly.

The reduced pressure which is employed during stage II of the condensation is advantageously less than about 15 mm. of Hg of pressure. Most advantageously, the pressure is about 0.5 mm. of Hg of pressure. Generally speaking, pressures are employed which are the lowest pressures obtainable by the employment of an efficient high-vacuum mechanical pump. Such pressures are generally in the range of less than 1 mm. of Hg pressure.

The time required for each of the two stages can advantageously be from about one half to 4 or 5 hours. Longer or shorter periods of time can also be employed.

The inert atmospheres which can be advantageously employed in the course of the condensation reaction include atmospheres of nitrogen, hydrogen, helium, carbon dioxide, etc.

It is generally advantageous to stir the condensation reaction mixture in order to maintain a reasonably even distribution of temperature throughout the reaction mixture and to otherwise facilitate the condensation. However, this is not essential especially when small quantities of bis-(carbonate) monomers are being condensed. During the course of the reaction, an alkyl ester or an aryl ester of carbonic acid will be evolved as a gas, as indicated hereinabove. Stirring facilitates the removal of this material in its gaseous form. Either as an aid to the stirring operation or in lieu thereof, the inert gas can be advantageously bubbled through the reaction mixture whereby the removal of the carbonic acid ester is also facilitated.

The various conditions described somewhat generally hereinabove in regard to the process of this invention can obviously be altered to suit the particular starting material being condensed and other conditions which are specific to the reaction being accomplished depending upon the particular set of circumstances. These variations are set forth to some extent in the examples below.

The products of this invention are linear highly polymeric crystalline polycarbonates having melting points of about 200° C., high intrinsic viscosities and containing the following repeating units:

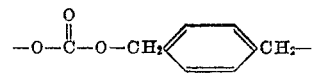

wherein the units are connected by ester linkages. In this specification all intrinsic viscosities are measured by standard procedures employing solutions in 60% phenol-40% sym. tetrachlorethane. The melting points of the polycarbonates described in the examples hereinbelow were all at least 195° C. and were generally from 200° C. up to 220° C.

The bis-(carbonate) monomers of this invention have been found to possess certain qualities that can be improved upon by the formation of interpolycarbonates as described in our copending applications filed February 2, 1954, Serial Numbers 407,804, 407,805 and 407,806. Besides employing bis-(carbonate) monomers in the formation of interpolycarbonates, the polycarbonates of this invention can be mechanically admixed with other polycarbonates to form mixed polymers possessing average properties derived from the various components of the mixture. It is similarly obvious that both the unmodified polycarbonates and interpolycarbonates can be suitably blended or mixed with other polycarbonates, polyesters, polyurethanes, polyamides, polystyrenes, polyethylene, etc. insofar as the polycarbonates of this invention are compatible with such high polymers. The products which can be produced include waxes, fibers, molded articles, extrusion products, coating materials, etc.

The polycarbonates of this invention can be prepared by various continuous processes employing many types of apparatus known to be useful in conducting various related continuous processes as described in the prior art, for example, the method described in U. S. 2,647,885 can be suitably adapted. For another example, a suitable elongated cylindrical reaction vessel (either upright or mounted in an angle) can be employed whereby the first stage of the reaction can be performed by introducing the starting material into the top of the reaction vessel to form an initial charge. The reaction vessel employed can be advantageously provided with a stirring device, a gas inlet and a heating means. The introduced bis-(carbonate) monomer can then be mixed with one of the described ester-interchange catalysts and stirring can be begun while heat is applied. An inert gas such as hydrogen can be introduced into the reaction vessel so as to bubble into the mixture, or such a gas can merely be maintained as an atmosphere above the mixture. When a sufficient period of time has elapsed to complete the first stage of the reaction process, some of the reaction mixture can be withdrawn through a valve in the bottom of the reaction vessel and more of the starting material introduced into the top thereof. The material removed from the bottom of the reaction vessel can then be immediately introduced into a stage II reaction vessel equipped in the same manner as the first reaction vessel and additionally provided with a high vacuum mechanical pump. It is generally advantageous to conduct the second stage of the reaction as a batch operation although by employing a sufficiently elongated stage II reaction vessel, the process can be conducted continuously by gradually feeding the partial condensate from stage I into one end of the stage II reaction vessel and continuously by removing the final polycarbonate from the other end of the reaction vessel after the elapse of sufficient time at the elevated temperature and vacuum.

The bis-(carbonate) monomers employed in accordance with this invention can be prepared by condensing an alkyl or an aryl chlorocarbonate with p-xylylene glycol in the presence of pyridine. Although it is advantageous to carry out this condensation in a tertiary amine such as pyridine, other acid binding agents can also be employed. Advantageously, the reaction mixture can be cooled to prevent excessive increase in temperature. Advantageously, more than two mole proportions of alkyl or aryl chlorocarbonate or bromocarbonate are employed for each mole proportion of p-xylylene glycol. Upon suitable purification, the reaction mixture gives a good yield of a p-xylylene glycol-bis-(alkyl or aryl carbonate). Various modifications of this process can obviously be employed to produce the bis-(carbonate) monomer starting material.

The following example will serve to further illustrate how these bis-(carbonate) monomers can be prepared:

*Example 1.—Preparation of p-xylylene glycol-bis-(ethyl carbonate)*

To 1 mole of p-xylylene glycol dissolved in 500 ml. of pyridine was added with stirring and cooling in an ice bath 2.25 moles of ethyl chlorocarbonate over a period of one hour. Stirring was continued for another hour after which the mixture was allowed to stand for twenty hours. It was then stirred with 2 kg. of crushed ice and water and extracted with ether. The ether extracts were washed with dilute hydrochloric acid and with water and dried. After removal of the ether, the product was purified by distillation or recrystallization from alcohol to give p-xylylene glycol-bis(ethyl carbonate), M. P. 44–45° C.

*Anal.*—Calc'd for $C_{12}H_{14}O_6$: C, 59.6; H, 6.3; mol. wt. 282. Found: C, 59.9; H, 6.3; mol. wt. 280.

*Example 2.—p-xylylene glycol-bis-(phenyl carbonate)*

The procedure described in Example 1 was repeated exactly except that 2.25 moles of phenyl chlorocarbonate was employed in lieu of the ethyl chlorocarbonate.

*Example 3.—p-xylylene glycol-bis-(pentyl carbonate)*

The procedure described in Example 1 was repeated exactly except that 2.25 moles of pentyl bromocarbonate was employed.

It is believed readily apparent that other corresponding bis-carbonate monomers can be prepared employing alkyl or aryl chlorocarbonates wherein the alkyl radicals contain from 1 to 8 carbon atoms and the aryl radicals are members of the benzene series containing from 6 to 8 carbon atoms.

The bis-(carbonate) monomers, prepared as described above, can be employed in accordance with the following examples which serve to further illustrate this invention as regards the polycarbonates and their preparation.

*Example 4.—Polycarbonate prepared by employing titanium butoxide as catalyst*

A quantity of fifty-five grams of p-xylylene glycol-bis-(ethyl carbonate) was prepared as described in Example 1, and 10 drops of titanium butoxide in 15 cc. n-butanol was added. The mixture was then heated in an atmosphere of nitrogen at 250° C. for two hours (stage 1). The resulting product was stirred and heated at 250° C. in vacuum (0.2 mm.) for an additional hour (stage II). The resulting viscous clear dope crystallized with extreme rapidity to give a white porcelain-like product.

*Example 5.—Polycarbonate prepared by employing titanium butoxide as catalyst*

Two hundred and fifteen grams of p-xylylene glycol bis-(ethyl carbonate) was melted, and eleven drops of titanium butoxide was added. The reaction mixture was heated under an atmosphere of nitrogen for an hour and twenty minutes in an oil bath at 200–240° C. (stage I). During this period the ethyl carbonate which formed was distilled from the reaction flask. The reaction mass was then stirred at 0.5 mm. Hg pressure for three hours and forty minutes while being heated in a 255° C. oil bath (stage II). Upon cooling, a white crystalline porcelain-like product was obtained. The intrinsic viscosity as measured in a 60:40 phenol:tetrachloroethane mixture was 0.62; M. P. 239° C.

*Example 6.—Polycarbonate employing titanium butoxide as catalyst*

Two hundred and fifteen grams of p-xylylene glycol-bis(butyl carbonate) was placed in a 500 cc. flask equipped with a ground glass neck and a side arm. Eleven drops of titanium butoxide was added (see Example 4), and the reaction mixture was melted in a 265° C. oil bath. Hydrogen was bubbled through the reaction mixture during stage I. Diethyl carbonate was removed by distillation. After one hour and thirty minutes, a stirrer assembly was inserted, and the reaction mixture stirred under 0.2–0.3 mm. pressure for 3.5 hours. The resulting polymer crystallized rapidly when cooled. It was a hard, white porcelain-like product with an intrinsic viscosity of 0.60. The viscosity was measured in a 60:40 phenol:tetrachloroethane mixture.

The catalysts employed in accordance with the instant invention result in the production of polycarbonates which have the advantageous properties described hereinabove whereas many of the other better known ester-interchange catalysts result in the production of polycarbonates which have a low molecular weight and are wax-like products of inferior properties. Such inferior products result when sodium is employed as the catalyst, as well as when other presumably efficient ester-interchange catalysts are employed. For example, lithium aluminum ethylate is known to be an efficacious ester-interchange catalyst; however, it has not been found to be satisfactory in preparation of the products of this invention. In order to illustrate the improvement of this invention over processes which employ other ester-interchange catalysts, the following examples are presented:

*Example 7.—Inoperative character of $NaOC_2H_5$ as catalyst*

A sample of p-xylylene glycol-bis(ethyl carbonate) was placed in a tube and a few drops of catalyst solution was added. The catalyst solution was prepared by dissolving one gram of sodium in 100 cc. of ethanol. Nitrogen was bubbled through the reaction mixture, which was heated in an oil bath at 240° C. After the initial distillate, which proved to be diethyl carbonate, had been removed, the tube was attached to a vacuum pump and heated at 240° C. for one-half hour. The residual polymer was waxy and had a low molecular weight.

*Example 8.—Inoperative character of $LiAl(OC_2H_5)_4$ as catalyst*

Four hundred grams of p-xylylene glycol-bis-(ethyl carbonate) was mixed with 5 cc. of lithium aluminum ethylate catalyst solution. This solution was prepared by dissolving 1 g. of lithium aluminum hydride in 100 cc. of ethanol. Nitrogen was bubbled through the reaction mixture for 2.5 hours at 200° C. The reaction mixture was stirred under water pump pressure for 30 minutes and then a Pressovac mechanical vacuum pump was attached. A satisfactory pressure could not be obtained due to the rapid evolution of carbon dioxide. After one hour under the vacuum pump, the reaction was stopped. The resulting polymer was a yellow wax-like material. It was soluble in chloroform and in tetrachloroethane. (Neither of these solvents will dissolve poly p-xylylene carbonate.) It possessed an aldehydic odor.

*Example 9.—Similar to Example 8—LiAl($OC_2H_5$)$_4$*

Two hundred and fifty-five grams of p-xylylene glycol-bis (ethyl carbonate) was mixed with 5 cc. of lithium aluminum ethylate catalyst (see Example 8). The first stage of the reaction was run at 250° C. for two hours and ten minutes under nitrogen. The diethyl carbonate was allowed to distill. The mixture was stirred under water pump pressure for forty-five minutes and then a Pressovac pump was attached. The bath temperature was kept at 250° C. The melt viscosity went through a maximum, and crystalline material began to sublime on the neck of the reaction flask. The pressure rose in the flask and after one hour and forty-five minutes of this stage, the reaction was discontinued. The reaction product was similar in appearance and properties to that from Example 8.

*Example 10.—Similar to Example 7*

The procedure described in Example 7 was repeated exactly except that lithium aluminum ethylate was employed as the catalyst (see Example 8). The same results described in Example 7 were obtained.

In order to determine the nature of the decomposition described in Examples 7, 8, 9 and 10 the following examples were performed:

*Example 11.—Effect of LiAl($OC_2H_5$)$_4$ on benzyl ethyl carbonate*

One hundred grams of benzyl ethyl carbonate was mixed with 4 cc. of lithium aluminum ethylate catalyst (see Example 8), in a flask equipped with a short distilling column and a variable reflux ratio take-off still head. The flask was heated in a 250° C. oil bath for three hours and fifteen minutes. During the first 1.75 hours of this time, 24 g. of diethyl carbonate $n_D^{25}$ 1.3860, was collected. The gas which was evolved during this period was identified as carbon dioxide. The residue was then distilled, and the following results were obtained.

| Fraction | B. P. | $n_D^{25}$ | Yield, g. |
| --- | --- | --- | --- |
| I | 36°/22 mm | 1.4075 | 1 |
| II | 72–76°/22 mm | 1.4451 | 1 |
| III | 76–80°/22 mm | 1.4910 | 7 |
| IV | 84–94°/0.6 mm | 1.5190 | 2 |
| V | 94–98°/0.6 mm | 1.5400 | 3 |
| VI | 98°/0.6 mm | 1.5608 | 41 |

Fraction VI is dibenzyl ether. The other fractions are mixtures containing some benzyl ethyl carbonate, toluene and benzaldehyde. The benzaldehyde was identified as its 2,4-dinitrophenylhydrazone and the toluene by its odor. No dibenzyl carbonate was isolated.

*Example 12.—Effect of Ti($OC_4H_9$)$_4$ on benzyl ethyl carbonate*

One hundred grams of benzyl ethyl carbonate was mixed with 0.1 cc. titanium butoxide and heated under nitrogen at 250° C. for thirty-five minutes during which time diethyl carbonate was allowed to distill. This heating was continued for a total of three hours and then the residue was distilled. Some starting material was recovered and a 73% yield of dibenzyl carbonate obtained. There was no evidence of dibenzyl ether, benzaldehyde or toluene.

The following examples show that lithium methylate is also inoperative as a catalyst for the preparation of the polycarbonates of this invention.

*Example 13.—Inoperative character of LiOCH$_3$, as catalyst*

Fifty grams of p-xylylene glycol-bis-(ethyl carbonate) was mixed with 0.6 cc. (0.0008 equivalent of Li) of lithium methylate catalyst (prepared by dissolving 1 g. of lithium in 100 cc. of methanol solution). The reaction flask was equipped with a mechanical stirrer, a nitrogen inlet tube and a side tube for removal of volatile reaction products. After stirring for one hour under nitrogen at 250° C., a Pressovac mechanical vacuum pump was attached. Within a period of ten minutes, a foamed polymer had formed which wrapped around the stirrer. The pressure rose from 1 to 5 mm. during the next twenty minutes and decomposition products were distilling through the side arm. These distilled products possessed aldehyde odors and formed 2,4-dinitrophenylhydrazone derivatives. The reaction was stopped after twenty minutes under vacuum. The resulting polymer was a yellow foam which was rubbery when warm. When cooled it was a flexible, non-tacky, spongy material. It had an intrinsic viscosity of 0.20 in 60:40 (by volume) phenol:tetrachloroethane.

*Example 14.—Similar to Example 13—LiOCH$_3$*

This experiment was similar to that of Example 13 with the exception that 0.3 cc. of catalyst (0.004 equivalent of lithium) was used. After ten minutes of the vacuum stage (stage II), carbon dioxide was being evolved and a foamed polymer was formed. The reaction was stopped. This product had an intrinsic viscosity of 0.39 and was a yellow, hard foam. These differences, when compared to the polymer from Example 13, are due to the shorter reaction time and hence less breakdown.

*Example 15.—Similar to Examples 13 and 14—LiOCH$_3$*

The procedure described in Example 14 was repeated exactly except that the vacuum in stage II was continued for one-half hour. A product with an intrinsic viscosity of 0.10 was obtained which was a soft, spongy product when cooled.

*Example 16.—Similar to Examples 13, 14 and 15— LiOCH$_3$*

This experiment was similar to that of Examples 13, 14 and 15 with the exception that 0.1 cc. of catalyst (0.00013 equivalent of lithium) was used. After thirteen minutes of the vacuum stage, the polymer began to foam and after another seven minutes, carbon dioxide was evidenced by the lime water test. The vacuum stage was run for a total of thirty-five minutes. The resulting polymer was a soft foam when warm but hardened to a horny, yellow, porous material. It had an intrinsic viscosity of 0.13 in 60:40 (by volume) phenol:tetrachloroethane.

*Example 17.—Similar to Examples 13, 14, 15 and 16— LiOCH$_3$*

This was similar to Examples 13, 14, 15 and 16 except that 0.05 cc. of catalyst (0.00007 equivalent of lithium) was used. The vacuum stage was run for one hour and ten minutes. This relatively long reaction time caused extensive degradation of the intermediate polycarbonate. The resulting polymer was similar in appearance to that of Example 16, but its intrinsic viscosity was lower, viz. 0.07.

*Example 18.—Similar to Examples 7 and 13—NaOCH$_3$*

Fifty grams of 1,4-bis(hydroxymethyl)benzene-bis-(ethyl carbonate) was mixed with 2 cc. of sodium methylate solution (1 g. sodium/100 cc. of methanol solution), i. e. 0.0008 equivalent of sodium. The reaction was run according to the procedure in Example 13. When vacuum was applied, the viscosity of the polymer increased rapidly and within ten minutes a dry foam had formed which wrapped around the stirrer shaft. The reaction was stopped after fifteen minutes under vacuum. The resulting polymer was a hard, yellow, porous material when cold. It had an intrinsic viscosity of 0.30.

*Example 19.—Similar to Examples 7, 13 and 18— NaOCH₃*

This experiment was similar to Example 18 except that the catalyst concentration was reduced to 0.5 cc. of sodium methylate solution (0.0002 equivalent of sodium). After one-half hour under vacuum the polymer became stiff and foamy as was true in Example 21, after ten minutes. After a total of forty-five minutes under vacuum, the foamy product had wrapped around the stirrer shaft, and the reaction was stopped. The polymer was rubbery while warm, but it cooled to a yellow, horny, porous solid.

*Example 20.—Inoperative character of $Mg(OCH_3)_2$ as catalyst*

Fifty grams of p-xylylene glycol-bis-(ethyl carbonate) was mixed with 1.0 cc. of magnesium methylate solution (1 g. magnesium/100 cc. methanol solution) i. e. 0.0008 equivalent of magnesium, and the polymerization was run under the conditions described in the foregoing examples. After a short time under the vacuum stage, the polymer began to foam and after one-half hour under vacuum, the polymer wrapped around the stirrer. The product was a rubbery foam when warm, but it cooled to a hard porous material. Intrinsic viscosity, 0.50.

*Example 21.—Similar to Example 20—$Mg(OCH_3)_2$*

Two experiments similar to that of Example 20 were run, but only one half as much magnesium methylate was used, i. e. 0.0004 equivalent of magnesium. After one-half hour under vacuum a foamy polymer had formed. In each case the polymers cooled to dry brittle foams, each having an intrinsic viscosity of 0.40.

The above examples, particularly Examples 11 and 12 demonstrate that the bis-(carbonate) monomer employed as a starting material according to the instant invention undergoes a series of reactions in the presence of most ester-interchange catalysts which can be graphically portrayed as follows beginning with the following starting material:

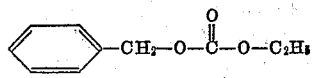

This starting material is analogous to the structure in p-xylylene glycol-bis-(ethyl carbonate). The decomposition of this starting material as catalyzed by most ester-interchange catalysts can be illustrated as follows:

Step A

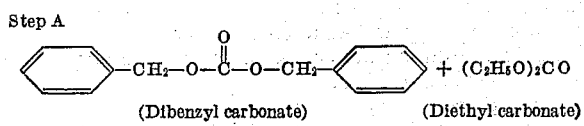

(Dibenzyl carbonate)   (Diethyl carbonate)

The dibenzyl carbonate then decomposes as follows:

Step B 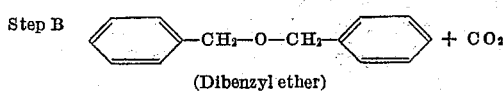

(Dibenzyl ether)

The dibenzyl ether may then decompose as follows:

Step C 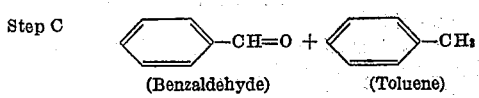

(Benzaldehyde)   (Toluene)

It would appear that the benzyl structure existing in the bis-(carbonate) monomer is unstable and decomposes in the presence of most ester-interchange catalysts to yield various undesirable products including carbon dioxide, whereby any polymeric material which might be formed in low yield is caused to become spongy and worthless for most purposes.

This situation demonstrates the unusual advantages of employing the titanium catalysts covered by the applicants' invention. Several of the preceding examples illustrate the employment of titanium butoxide as the catalyst. This compound and many of its homologs are thick liquids. One drop weighs about 0.015 gram and contains about 0.0002 equivalent of titanium. It is sometimes advantageous to dissolve these liquids in an alcohol to facilitate handling the catalyst.

Another titanium compound which has been found to be useful is titanium tetrachloride. Titanium tetrachloride is difficult to handle because of its rapid reaction with the moisture in the air. It has therefore been found advantageous to employ this compound in the form of an ether complex. In preparing these complexes, the lower aliphatic ethers containing from 2 to 8 carbon atoms on either side of the central oxygen atom and the cyclic ethers such as 1,4 dioxane can be employed. The ether complexes are prepared advantageously by adding titanium tetrachloride slowing to an excess of the ether. It is advantageous to maintain the ether at ambient temperatures (20°–30° C.) or lower during this addition. Examples regarding the preparation of these ether complexes are presented below:

*Example 22.—1,4-dioxane complex with $TiCl_4$*

Titanium tetrachloride was added slowly to an excess of 1,4-dioxane. The yellow precipitate which formed was filtered and dried in a vacuum desiccator over $P_2O_5$. As such, it could be conveniently used as a catalyst.

*Example 23.—Diethyl ether complex of $TiCl_4$*

Titanium tetrachloride was added slowly to an excess of diethyl ether which was cooled in an acetone-Dry Ice bath. The solid which precipitated was separated and dried in a vacuum desiccator over $P_2O_5$.

This was used as a catalyst as illustrated in Example 24 which serves to further illustrate our invention:

*Example 24.—Polycarbonate employing diethyl ether complex of $TiCl_4$ as catalyst*

A ten-gram sample of p-xylylene glycol-bis-(ethyl carbonate) was heated under nitrogen with 0.1 gm. of the ether complex (Example 23) for twenty-five minutes at 250° C. The catalyst dissolved immediately and diethyl carbonate began to distill within about three minutes. After the initial twenty-five minute stage I, the reaction mixture was stirred under vacuum for one hour and forty-five minutes (stage II). The product was similar to that described in Example 25. It had an intrinsic viscosity of 0.37 in 60:40 phenol:tetrachloroethane.

*Example 25.—Polycarbonate employing $TiCl_4$ as catalyst*

Fifty grams of p-xylylene glycol-bis-(ethyl carbonate) was heated with two drops of titanium tetrachloride, under nitrogen, for one hour in an oil bath maintained at 250° C. The resulting product was then stirred under 0.2 mm. pressure for an additional 1.25 hours at 250° C. The resulting clear, viscous melt crystallized rapidly upon cooling to yield a dense, hard, white porcelain-like product. It was soluble in 60:40 phenol:tetrachloroethane at 110° C. and had an intrinsic viscosity of 0.40.

As in Example 12, the following describes the similar effect of $TiCl_4$ as an effective catalyst according to our invention:

*Example 26.—Effect of $TiCl_4$ on benzyl ethyl carbonate*

A mixture of one hundred grams of benzyl ethyl carbonate and 0.5 cc. of titanium tetrachloride was heated in a 250° C. oil bath. Nitrogen was passed over the reaction mixture. During a period of one hour and fifteen minutes, 18.4 g., $n_D^{25}$—1.3870, of diethyl carbonate was collected. The residue was then fractionated as follows:

| Fraction | B. P., °C. | $n_D^{25}$ | Yield |
|---|---|---|---|
| 1 | 36–44°/23 mm | 1.3921 | 2.8 g. |
| 2 | 44°/23 mm | 1.3903 | 1.2 g. |
| 3 | 44–73°/23 mm | 1.4030 | 4.0 g. |
| 4 | 73–80°/23 mm | 1.4550 | 3.0 g. |
| 5 | 75°/0.8 mm | 1.4980 | 2.0 g. |
| 6 | 75–141°/0.75 mm | 1.5282 | 3.2 g. |
| 7 | 142°/0.75 mm | 1.5480 | 59.0 g. (Dibenzyl Carbonate). |

No dibenzyl ether was isolated.

It is believed that the preceding examples make it clearly apparent that the titanium catalysts are essential to the preparation of linear highly polymeric crystalline polycarbonates when self-condensing the bis-(carbonate) monomers of this invention. Other catalysts such as the alkali metal and the alkaline earth metal alkoxides are strikingly inferior to the titanium compounds.

In addition to the employment of the titanium alkoxides, titanium tetrachloride and the ether complexes of titanium tetrachloride, other related derivatives of titanium can also be employed in accordance with this invention such as the bimetallic complexes and quaternary ammonium complexes described in Caldwell, application Serial No. 313,072, filed October 3, 1952, now United States Patent 2,720,502 granted on October 11, 1955, and Wellman and Caldwell, application Serial No. 313,075, filed on October 3, 1952, now United States Patent 2,727,881 granted December 20, 1955. The following examples will serve to further illustrate this aspect of our invention.

*Example 27.—Polycarbonate employing Ti(OC4H9)4 as catalyst*

Fifty grams of p-xylylene glycol-bis-(ethyl carbonate) and four drops (0.060 g.) of titanium butoxide (0.0008 equivalent of titanium) were mixed. The reaction flask was similar to that used in Example 13. The reaction was run under nitrogen for one hour at 250° C. and the diethyl carbonate which formed was removed by distillation (stage I). A Pressovac pump was attached and the reaction mixture stirred for one hour and fifteen minutes at 250° C. and 0.2 mm. Hg pressure. The resulting polymer was a dense, hard, white porcelain-like material. The intrinsic visosity was 0.41.

*Example 28.—Polycarbonate employing Ti(OC4H9)4 as catalyst*

This was run exactly as in Example 27 except that 2 drops (0.030 g.) of titanium butoxide (0.0004 equivalent of titanium) was used. The resulting poly p-xylylene carbonate was identical in appearance with the product from Example 16 and its intrinsic viscosity was 0.39.

*Example 29.—Polycarbonate employing Ti(OC4H9)4 as catalyst*

This was exactly like Examples 27 and 28 except that only 1 drop of titanium butoxide (0.0002 equivalent of titanium) was present in the reaction mixture. Again the poly p-xylylene carbonate was similar in appearance, and the intrinsic viscosity was 0.35.

*Example 30.—Polycarbonate employing TiBr4 as catalyst*

The process described in Example 25 was repeated exactly except that TiBr4 was employed as the catalyst. The polymer obtained was essentially the same as in Example 25; it had a melting point of 215° C.

*Example 31.—Polycarbonate employing Ti(OC2H5)4 as catalyst*

The process described in Example 6 was repeated exactly except that Ti(OC2H5)4 was employed as the catalyst. The polymer obtained was essentially the same as in Example 6 except for a somewhat lower intrinsic viscosity; it had a melting point of 210° C.

The polycarbonates of this invention can be prepared employing other catalysts and other reaction conditions in a manner analogous to that described in the preceding examples within the scope of the ranges and limits set forth hereinbefore.

The unexpected character of this invention is further emphasized by the fact that hydroquinone-bis-(ethyl carbonate) and the compound having the following formula:

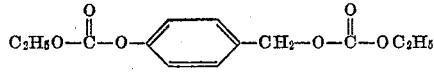

can not be satisfactorily employed in lieu of the bis-(carbonate) monomers of this invention as equivalents thereof. This is due to the fact that these monomeric starting materials produce infusible and insoluble products which are of no value in the preparation of fibers, film, molding compositions, etc. It also appears that some decomposition takes place during the formation of these products.

The polymeric products embodying this invention can be produced either batch-wise or by a continuous process, and can be used alone or in admixture with other polymeric materials as described or other well-known polymer modifiers. These products can be used for making fibers or molded articles, as well as photographic film supports for either black-and-white or color film or in similar applications for polymeric films or sheets.

The photographic films which can be produced can advantageously comprise a film support of the above-described polycarbonates upon which is deposited one or more layers of a silver halide emulsion which can contain appropriate sensitizers or other additives to suit the intended photographic use.

We claim:

1. A process for preparing a highly polymeric linear polycarbonate comprising (A) self-condensing a bis-(carbonate) monomer having the following formula:

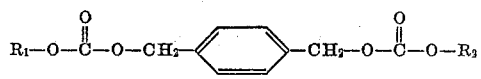

wherein R1 and R2 each represents a radical selected from the group consisting of lower alkyl radicals containing from 1 to 4 carbon atoms and aryl radicals of the benzene series containing from 6 to 8 carbon atoms, (B) in the presence of an ester-interchange catalyst containing titanium in its tetravalent state, (C) at an elevated temperature, (D) the condensation being conducted in an inert atmosphere and (E) the latter part of the condensation being conducted at a very low pressure.

2. A process as defined in claim 1 wherein the elevated temperature during the course of the condensation is in excess of about 200° C.

3. A process as defined in claim 2 wherein the ester-interchange catalyst is employed in an amount of from about 0.005% to about 0.2% based on the weight of the bis (carbonate) monomer.

4. A process as defined in claim 3 wherein the low pressure is less than about 15 mm. of Hg pressure.

5. A process as defined in claim 4 wherein the bis (carbonate) monomer is p-xylylene glycol-bis-(ethyl carbonate).

6. A process as defined in claim 3 wherein the catalyst is titanium butoxide.

7. A process as defined in claim 3 wherein the catalyst is the diethyl ether complex of titanium tetrachloride.

8. A process as defined in claim 3 wherein the catalyst is titanium tetrachloride.

9. A process as defined in claim 3 wherein the catalyst is the 1,4-dioxane complex of titanium tetrachloride.

10. A process as defined by claim 3 wherein the catalyst is titanium tetrabromide.

11. A linear highly polymeric polycarbonate prepared according to the process defined in claim 1.

12. A linear highly polymeric polycarbonate prepared according to the process defined in claim 5.

References Cited in the file of this patent

UNITED STATES PATENTS

| | | |
|---|---|---|
| 2,210,817 | Peterson | Aug. 6, 1940 |
| 2,385,932 | Muskat et al. | Oct. 2, 1945 |
| 2,468,975 | Held et al. | May 3, 1949 |

FOREIGN PATENTS

| | | |
|---|---|---|
| 879,250 | France | Nov. 19, 1942 |

OTHER REFERENCES

Carothers: Collected Papers Interscience, 1940.